US010502045B2

(12) United States Patent
Fouda et al.

(10) Patent No.: US 10,502,045 B2
(45) Date of Patent: Dec. 10, 2019

(54) MONITORING SUBSTANCES IN A WELL ANNULUS

(71) Applicant: Halliburton Energy Services, Inc., Houston, TX (US)

(72) Inventors: Ahmed E. Fouda, Houston, TX (US); Glenn A. Wilson, Singapore (SG); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 39 days.

(21) Appl. No.: 15/576,189

(22) PCT Filed: Jun. 24, 2015

(86) PCT No.: PCT/US2015/037498
§ 371 (c)(1),
(2) Date: Nov. 21, 2017

(87) PCT Pub. No.: WO2016/209229
PCT Pub. Date: Dec. 29, 2016

(65) Prior Publication Data

US 2018/0135405 A1 May 17, 2018

(51) Int. Cl.
*E21B 47/00* (2012.01)
*G01V 3/20* (2006.01)
(Continued)

(52) U.S. Cl.
CPC ........ *E21B 47/0005* (2013.01); *E21B 47/042* (2013.01); *G01V 3/20* (2013.01);
(Continued)

(58) Field of Classification Search
CPC .... E21B 47/0005; E21B 47/042; E21B 47/06; E21B 33/14; G01V 3/20; G01V 3/34; G01V 3/26
(Continued)

(56) References Cited

U.S. PATENT DOCUMENTS 5,416,425 A 5/1995 Mouaici
5,642,051 A 6/1997 Babour et al.
(Continued)

FOREIGN PATENT DOCUMENTS

WO 2006129070 12/2006
WO 2017086956 5/2017
WO 2017086957 5/2017

OTHER PUBLICATIONS

International Search Report and Written Opinion of PCT Application No. PCT/US2015/037498 dated Mar. 11, 2016: pp. 1-16.

*Primary Examiner* — Giovanni Astacio-Oquendo
(74) *Attorney, Agent, or Firm* — Chamberlain Hrdlicka

(57) ABSTRACT

A system can include a current source electrically connected to casing in a wellbore, and a sensor including a monitoring electrode, a potential difference between the casing and the electrode resulting from current applied by the current source, and the potential difference indicating an impedance of a substance in an annulus external to the casing. A method can include positioning sensors spaced apart along a casing in a wellbore, each of the sensors including an electrode in electrical contact with a substance in an annulus, inducing current in the casing, and measuring a potential difference between the casing and the electrode at each sensor. Another system can include a current source, the current source being electrically connected to casing in a wellbore, and a sensor including a monitoring electrode and an electro-optical transducer that converts a potential difference between the casing and the electrode into strain in an optical waveguide.

21 Claims, 14 Drawing Sheets

(51) Int. Cl.

| | |
|---|---|
| ***G01V 3/26*** | (2006.01) |
| ***G01V 3/34*** | (2006.01) |
| ***E21B 47/04*** | (2012.01) |
| *E21B 33/14* | (2006.01) |
| *E21B 47/06* | (2012.01) |

(52) U.S. Cl.
CPC .................. *G01V 3/26* (2013.01); *G01V 3/34* (2013.01); *E21B 33/14* (2013.01); *E21B 47/06* (2013.01)

(58) Field of Classification Search
USPC .......................................... 324/323, 324, 325
See application file for complete search history.

(56) References Cited

U.S. PATENT DOCUMENTS

| | | | | |
|---|---|---|---|---|
| 7,710,832 | B2 | 5/2010 | Forstall et al. | |
| 9,091,785 | B2 | 7/2015 | Donderici et al. | |
| 9,557,439 | B2 | 1/2017 | Wilson et al. | |
| 2012/0205103 | A1 | 8/2012 | Ravi et al. | |
| 2012/0206144 | A1 | 8/2012 | Barlet-Gouedard | |
| 2014/0062489 | A1 | 3/2014 | Pindiprolu et al. | |
| 2014/0191120 | A1 | 7/2014 | Donderici et al. | |
| 2014/0367092 | A1 | 12/2014 | Roberson et al. | |
| 2016/0178714 | A1* | 6/2016 | Fautz .................. | G01R 33/483 324/309 |
| 2016/0266269 | A1 | 9/2016 | Wilson et al. | |
| 2017/0082770 | A1 | 3/2017 | Mandviwala et al. | |
| 2017/0090060 | A1 | 3/2017 | Donderici et al. | |
| 2017/0123096 | A1 | 5/2017 | Wilson et al. | |
| 2017/0319097 | A1* | 11/2017 | Amthor .................. | A61B 5/055 |
| 2018/0024214 | A1* | 1/2018 | Bhat ................. | G01R 33/4828 324/309 |
| 2018/0135405 | A1* | 5/2018 | Fouda ................. | E21B 47/0005 |
| 2018/0259672 | A1* | 9/2018 | Samson ................ | E21B 47/102 |
| 2018/0283168 | A1* | 10/2018 | Ranjan .................. | E21B 43/162 |

* cited by examiner 48
50
10
I
52
54
20
54
12
54
56
14
26
54
54
20
54
16
46
56
54
20
54
54
18
56
28
56
20
54
54
54

58
34
40
TO ELECTRODES 54
TO CASING 14
60
60
60
60
60
60

MONITORING SUBSTANCES IN A WELL ANNULUS

TECHNICAL FIELD

This disclosure relates generally to equipment utilized and operations performed in conjunction with a subterranean well and, in one example described below, more particularly provides for monitoring substances in wellbore annuli.

BACKGROUND

It can be beneficial to be able to determine a presence, displacement, type or other characteristic of fluids or other substances in an annulus in a well. For example, a quality of a cementing operation can be compromised by incomplete displacement of fluid from an annulus by cement, or by mixing of the fluid with the cement. For this reason and others, it will be appreciated that advancements in the art of monitoring substances in a well annulus are continually needed.

DETAILED DESCRIPTION

Figure 1:
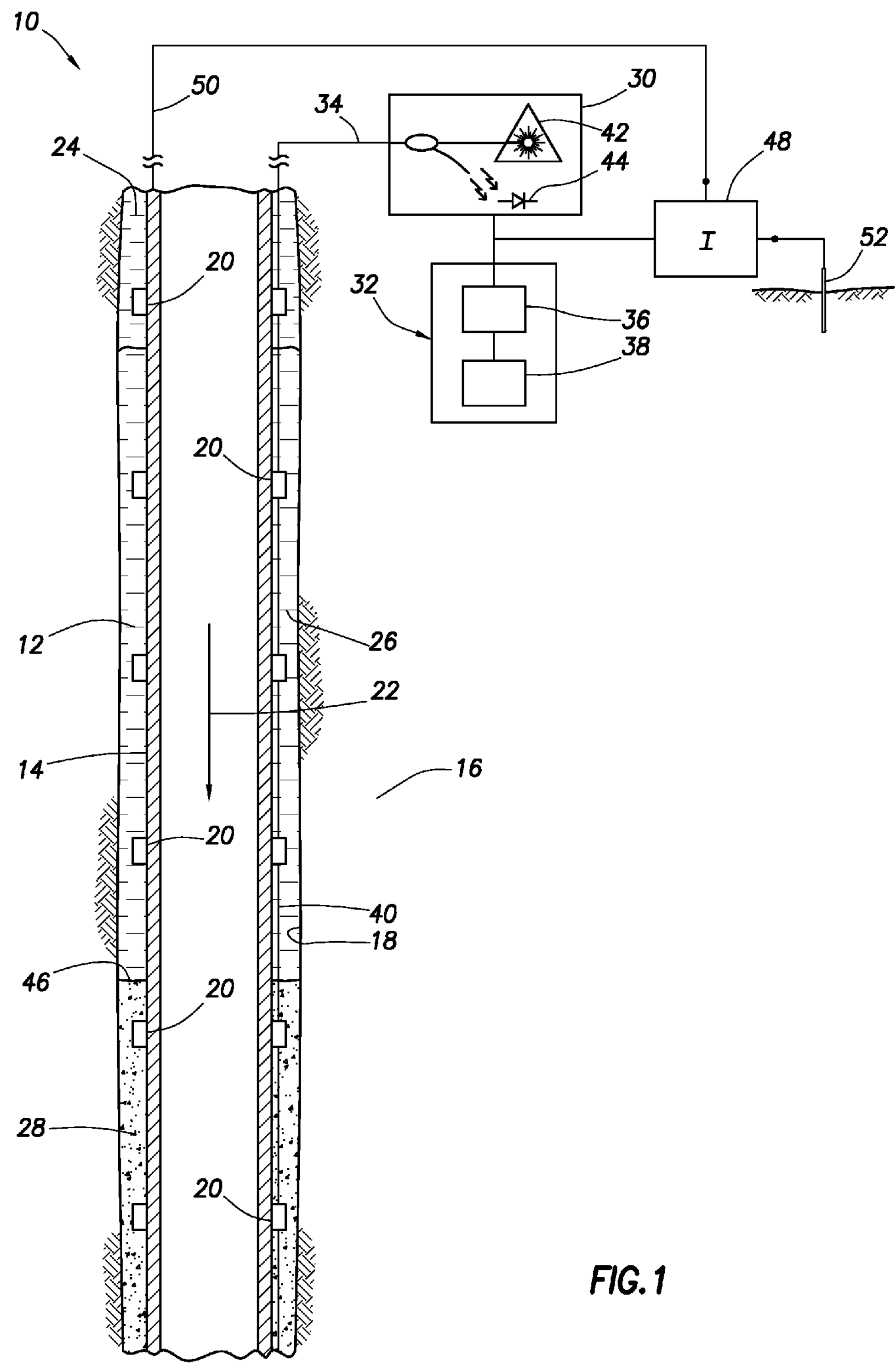
FIG. 1 is a representative partially cross-sectional view of a well monitoring system and associated method which can embody principles of this disclosure.

Representatively illustrated in FIG. 1 is a well monitoring system 10 and associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In one embodiment, the system 10 provides for measuring and monitoring of substances in an annulus 12 of a well formed between a casing 14 and an earth formation 16 penetrated by a wellbore 18. In one embodiment, the method provides for modeling, inversion and imaging of data acquired by the system 10 using electromagnetic (EM) sensors 20 distributed along the casing 14.

In one example, fluids 22 are flowed downwardly through the casing 14, and then upwardly through the annulus 12, during a cementing operation. Oil-based or water-based drilling fluid 24 (or an emulsion thereof) is initially in place in the annulus 12 between the casing 14 and the formation 16. A spacer fluid 26, and then cement 28 (typically as a slurry), are subsequently pumped through the casing 14 and into the annulus 12.

The cement 28 slurry displaces the spacer fluid 26, which in turn displaces the drilling fluid 24. The cement 28 is allowed to set in the annulus 12, thereby sealing off the annulus and securing the casing 14 in the wellbore 18.

As used herein, the term "casing" is used to indicate a protective wellbore lining. Casing can be in forms known to those skilled in the art as casing, liner or tubing. Casing can be made of metals or non-metals. Casing can be segmented or continuous. Casing can be pre-formed or formed in situ. Thus, the scope of this disclosure is not limited to use of any particular type of casing.

As used herein, the term "cement" is used to indicate a material that hardens, cures or "sets" in a well to thereby seal off a space. Cement can be used to seal off an annulus between a casing and a wellbore, or can be used to seal off an annulus between two tubulars. Cement can be used to seal off a passage in a tubular. Cement is not necessarily cementitious, since cements can be made up of polymers (such as epoxies, etc.) and/or other materials, which can harden due to passage of time, exposure to elevated temperature, exposure to other substances, etc. Thus, the scope of this disclosure is not limited to use of any particular type of cement.

Contamination of the cement 28 with the drilling fluid 24 or spacer fluid 26 can have significant negative consequences for curing and integrity of the cement, and can provide potential conduits for future flow in the annulus 12 external to the casing 14. Thus, the cement's 28 structural integrity and sealing ability can be affected by the presence of other fluids in the annulus 12 while the cement is hardening therein.

In order to diagnose and assess a quality of the cement 28 during and after placement, as well as during a life of the well (e.g., due to exposure to $CO_2$, acidizing, hydraulic stimulation, etc.), multiple EM sensors 20 are deployed longitudinally spaced apart along the casing 14, for example, adjacent to the fluids 24, 26, 28 in the annulus 12 between the casing and the formation 16.

A line or cable 40 also extends through the wellbore 18. The cable 40 may be attached external to the casing 14, positioned in a wall of the casing, or otherwise positioned.

The cable 40 includes therein at least one optical waveguide 34 (such as, an optical fiber or an optical ribbon), and may include other lines (such as, electrical and/or hydraulic lines), strength members, etc. The cable 40 may, in some examples, be in the form of the optical waveguide 34 enclosed by armor or another protective covering (such as, a metal tube).

Whether or not the optical waveguide 34 is part of a cable, the optical waveguide could be internal or external to, or positioned in a wall of, any tubular string (such as, the casing 14). The scope of this disclosure is not limited to any particular form, configuration or position of the optical waveguide 34 in a well.

In the FIG. 1 example, the optical waveguide 34 is optically connected to an optical interrogator 30. The optical interrogator 30 is depicted schematically in FIG. 1 as including an optical source 42 (such as, a laser or a light emitting diode) and an optical detector 44 (such as, an opto-electric converter or photodiode).

The optical source 42 launches light (electromagnetic energy) into the waveguide 34, and light returned to the interrogator 30 is detected by the detector 44. Note that it is not necessary for the light to be launched into a same end of the optical waveguide 34 as an end via which light is returned to the interrogator 30.

Other or different equipment (such as, an interferometer or an optical time domain or frequency domain reflectometer) may be included in the interrogator 30 in some examples. The scope of this disclosure is not limited to use of any particular type or construction of optical interrogator.

A computer 32 is used to control operation of the interrogator 30, and to record optical measurements made by the interrogator. In this example, the computer 32 includes at least a processor 36 and memory 38. The processor 36 operates the optical source 42, receives measurement data from the detector 44 and manipulates that data. The memory 38 stores instructions for operation of the processor 36, and stores processed measurement data. The processor 36 and memory 38 can perform additional or different functions in keeping with the scope of this disclosure.

In other examples, different types of computers may be used, the computer 32 could include other equipment (such as, input and output devices, etc.). The computer 32 could be integrated with the interrogator 30 into a single instrument. Thus, the scope of this disclosure is not limited to use of any particular type or construction of computer.

The optical waveguide 34, interrogator 30 and computer 32 may comprise a distributed strain sensing (DSS) system capable of detecting strain energy as distributed along the optical waveguide. For example, the interrogator 30 can be used to measure Brillouin or coherent Rayleigh scattering in the optical waveguide 34 as an indication of strain energy as distributed along the waveguide.

In addition, a ratio of Stokes and anti-Stokes components of Raman scattering in the optical waveguide 34 could be monitored as an indication of temperature as distributed along the waveguide. In other examples, Brillouin scattering may be detected as an indication of temperature as distributed along the optical waveguide 34.

In further examples, fiber Bragg gratings (not shown) could be closely spaced apart along the optical waveguide 34, so that strain in the waveguide will result in changes in light reflected back to the interrogator 30. An interferometer (not shown) may be used to detect such changes in the reflected light.

As described more fully below, the system 10 and method provides for acquiring, processing and imaging EM data acquired from the sensors 20 permanently deployed on the casing 14, for purposes related to monitoring of substances in the annulus 12. In one example, placement and curing of the cement 28 can be monitored using the system 10 comprising the casing 14 as a source, with a plurality of azimuthally and/or axially arranged sensors 20. The sensors 20 can communicate measurements to the interrogator 30 and computer 32 using one or more cables 40.

This monitoring system 10 can be applied to, for example, detecting an interface 46 between the cement 28 and another substance (such as, drilling fluid 24 or spacer fluid 26, etc.) during placement, monitoring a cure state of the cement after placement, identifying, discriminating, and monitoring fluids 22 present in the annulus 12 formed between the casing 14 and formation 16 (e.g., cement, spacer fluid, drilling fluid, etc.).

In the FIG. 1 example, current is injected through the casing 14 into the formation 16 using a current source 48 (such as, a generator, batteries, etc.). Operation of the current source 48 may be controlled by the computer 32.

The sensors 20 are used to measure a potential difference between the casing 14 and monitoring electrodes (not shown in FIG. 1, see FIGS. 2-5) insulated from the casing. For example, as the cement 28 is pumped into the annulus 12, more current can flow through the relatively conducting cement rather than the higher resistivity drilling fluid 24.

In one embodiment, electric current is injected through the casing 14 via a power cable 50. The power cable 50 may in some examples be connected to a well head (not shown) or to the casing 14 at a monitoring zone of interest. Multiple power connections can be made if desired. A return electrode 52 is placed sufficiently far away from the casing 14.

Figure 2:
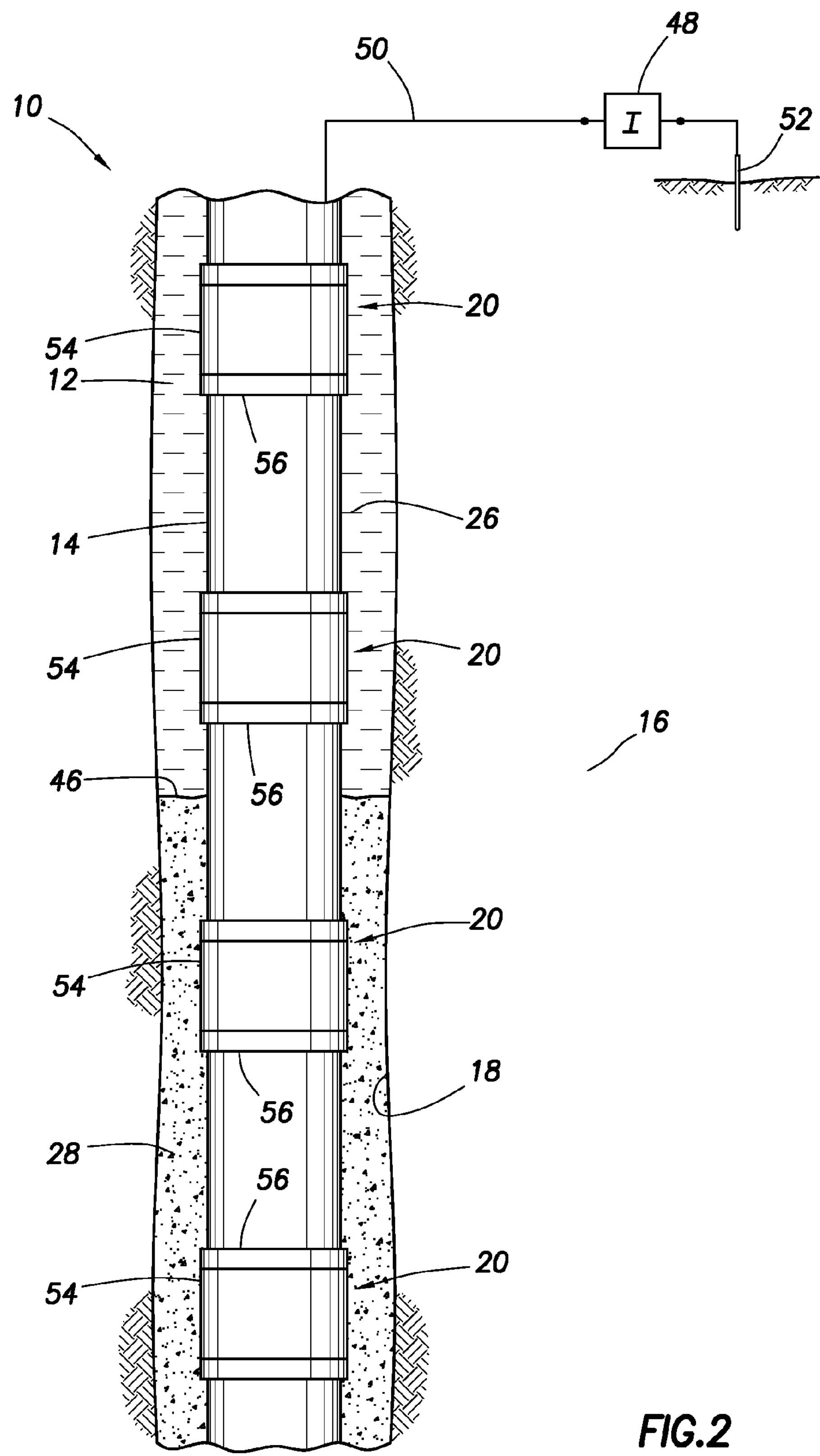
FIG. 2 is a representative partially cross-sectional view of another example of the system and method, wherein a single electrode is included in each of multiple sensors along a casing.

Referring additionally now to FIG. 2, a partially cross-sectional view of the system 10 is representatively illustrated. A side view of the casing 14 is depicted, but the optical interrogator 30 and computer 32 are not shown in FIG. 2.

In this example, the sensors 20 are mounted on the casing 14, or on casing collars or casing centralizers (not shown) for permanent monitoring. Each sensor 20 comprises a monitoring electrode 54 mounted on an insulator 56 so that the potential difference between the casing 14 and the electrode 54 can be measured.

In this example, the electrodes 54 can be galvanic or capacitive. Capacitive electrodes have negligible contact resistance and are less vulnerable to corrosion.

The insulators 56 may be made of any electrically insulating material that can withstand temperatures and pressures downhole, e.g., ceramic, fiberglass or epoxy resin. A thickness of the insulators 56 can range from 0.05 in. (~13 mm) to 0.5 in. (~1.3 cm). The thickness may be and optimized based on the available annulus 12 formed between the casing 14 and the wellbore 18, and maximum acceptable capacitive coupling (shorting) between the casing and the electrodes 54.

The electrodes 54 may be on the order of 6 in. (~15 cm) long. They can be chosen to be as large as practically possible, in order to minimize contact resistance.

The sensors 20 may have any spacing along the casing 14. The spacing may be chosen depending on a length of a monitoring zone and a desired vertical resolution. Depending on the formation 16 and the substances (e.g., drilling fluid 24, spacer fluid 26, cement 28, etc.) in the annulus 12, a typical spacing may be approximately 15 to 30 ft. (~5 to 10 m).

The sensors 20 (comprising electrodes 54, insulators 56, etc.) may be pre-fabricated in the form of circular or C-shaped collars that are clamped to the casing 14 while it is being deployed. The cable 40 (see FIG. 1) may be connected to each sensor 20 before or after the sensor is attached to the casing 14.

An optimum frequency of operation of the system 10 may range from DC (direct current) to 100 KHz. Lower frequencies can be used with greater sensor 20 spacing (for deep sensitivity) and higher frequencies can be used with less sensor spacing (for shallow sensitivity). In some embodiments, the current source 48 may also be used to anodize the casing 14 to prevent or minimize corrosion.

As mentioned above, in typical (although not all) situations, it is expected that the cement 28 during placement will be more conductive as compared to the drilling fluid 24 (particularly if the drilling fluid is oil-based) and the spacer fluid 26. Thus, in such situations, more of the current is expected to flow between the casing 14 and the return electrode 52 where cement 28 is present in the annulus 12.

Figure 3:
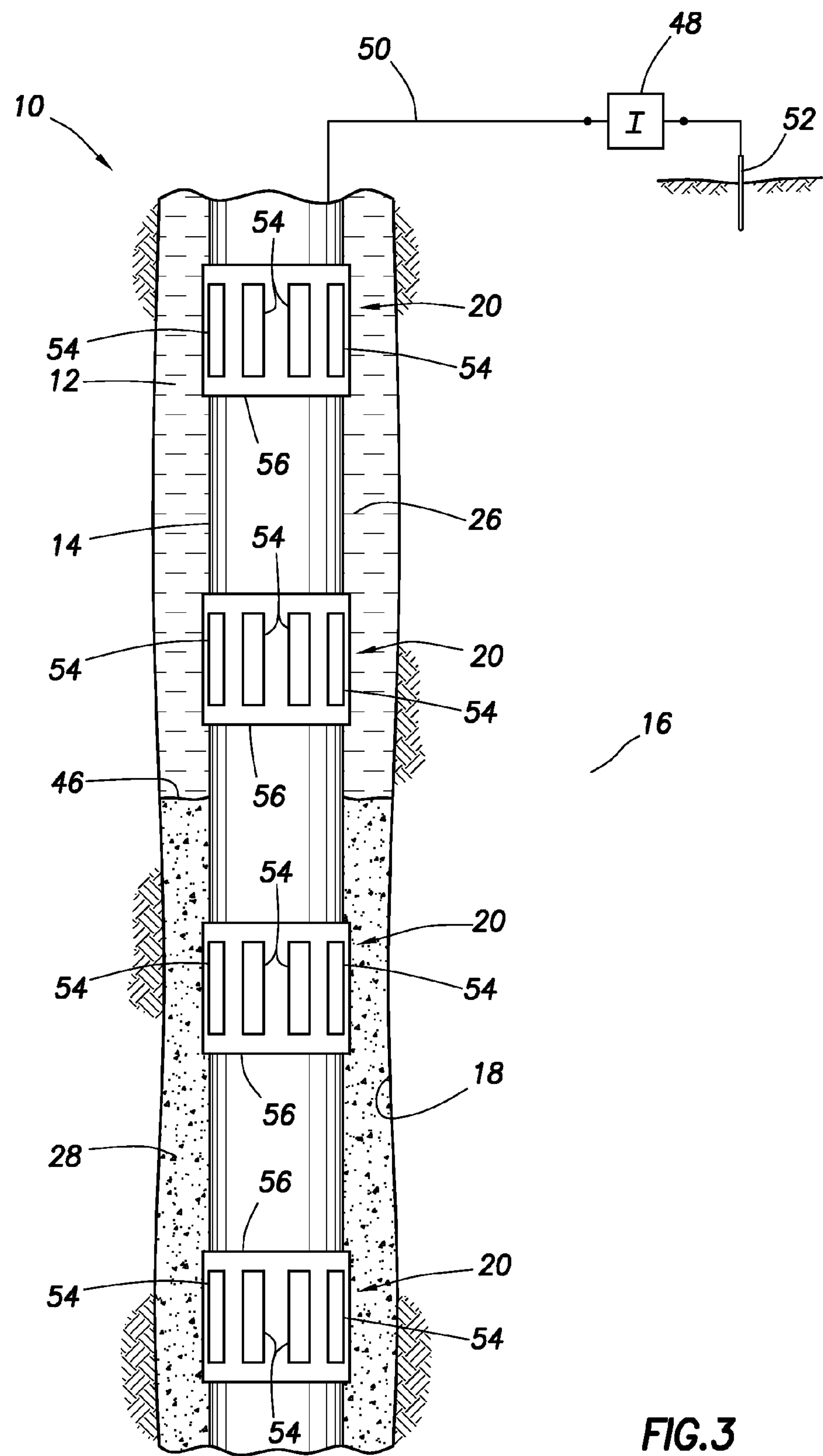
FIG. 3 is a representative partially cross-sectional view of another example of the system and method, wherein each of the sensors includes multiple electrodes.

Referring additionally now to FIG. 3, another example of the system 10 is representatively illustrated. In this example, each sensor 20 comprises multiple electrodes 54, circumferentially distributed about the casing 14 on the insulator 56, so that the potential difference between the casing and each electrode can be measured.

In this example, at least five azimuthal measurements are used to uniquely determine an azimuthal direction of changes in resistivity. For example, the electrodes 54 may each be approximately 2 in. (~5 cm) wide and 6 in. (~15 cm) long. The electrodes 54 can be chosen to be as large as practically possible to minimize contact resistance, while also chosen to be small azimuthally (e.g., circumferential width) to minimize shorting of azimuthal variations in the annulus 12.

Note that this FIG. 3 configuration is inherently focused. Current flows almost radially into the formation toward the distant return electrode 52. With an assumption that during cement 28 placement and curing no significant changes in formation 16 resistivity is expected to happen, time-lapse measurements during cement placement and curing can be used to monitor the cement.

Figure 4:
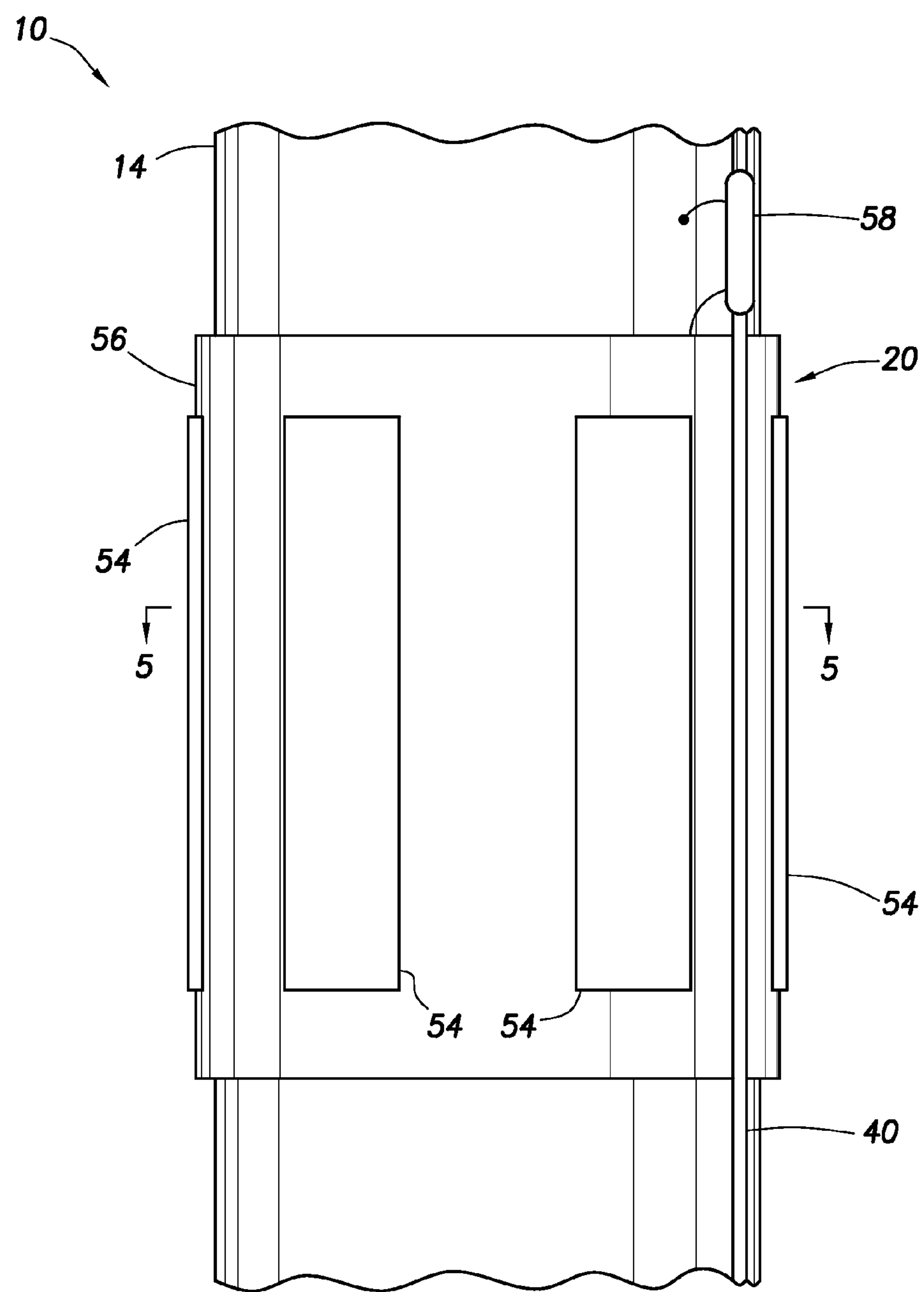
FIG. 4 is a representative enlarged scale side view of an example of a sensor on the casing.
Figure 5:
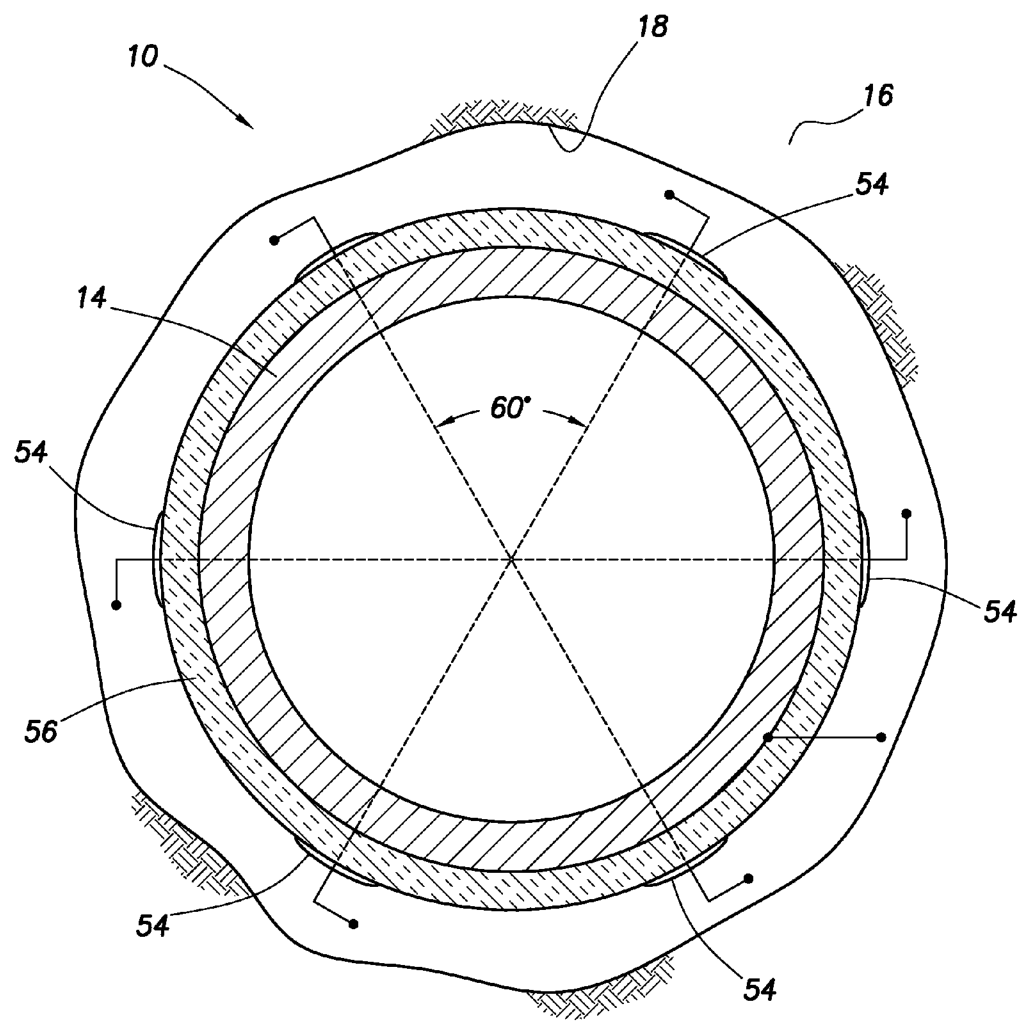
FIG. 5 is a representative cross-sectional view of the sensor in the system, taken along line 5-5 of FIG. 4.

Referring additionally now to FIGS. 4 & 5, an example of the sensor 20 is representatively illustrated in side and cross-sectional views thereof. FIG. 5 is an enlarged scale view taken along line 5-5 of FIG. 4.

In this example, six of the electrodes 54 are circumferentially spaced apart on the sensor 20. The electrodes 54 are equally azimuthally spaced by 60 degrees. However, other numbers and azimuthal spacings of the electrodes 54 may be used in other examples.

In the FIGS. 4 & 5 example, the cable 40 is used to communicate measured signals uphole. An electrical to mechanical converter 58 corresponding to each sensor 20 is used to convert the electrical potential differences between the casing 14 and electrodes 54 to mechanical strains in the optical waveguide 34 (not visible in FIG. 4, see FIG. 1). The mechanical strains can be detected by the interrogator 30 and processed, stored, displayed, etc., by the computer 32.

Figure 6:
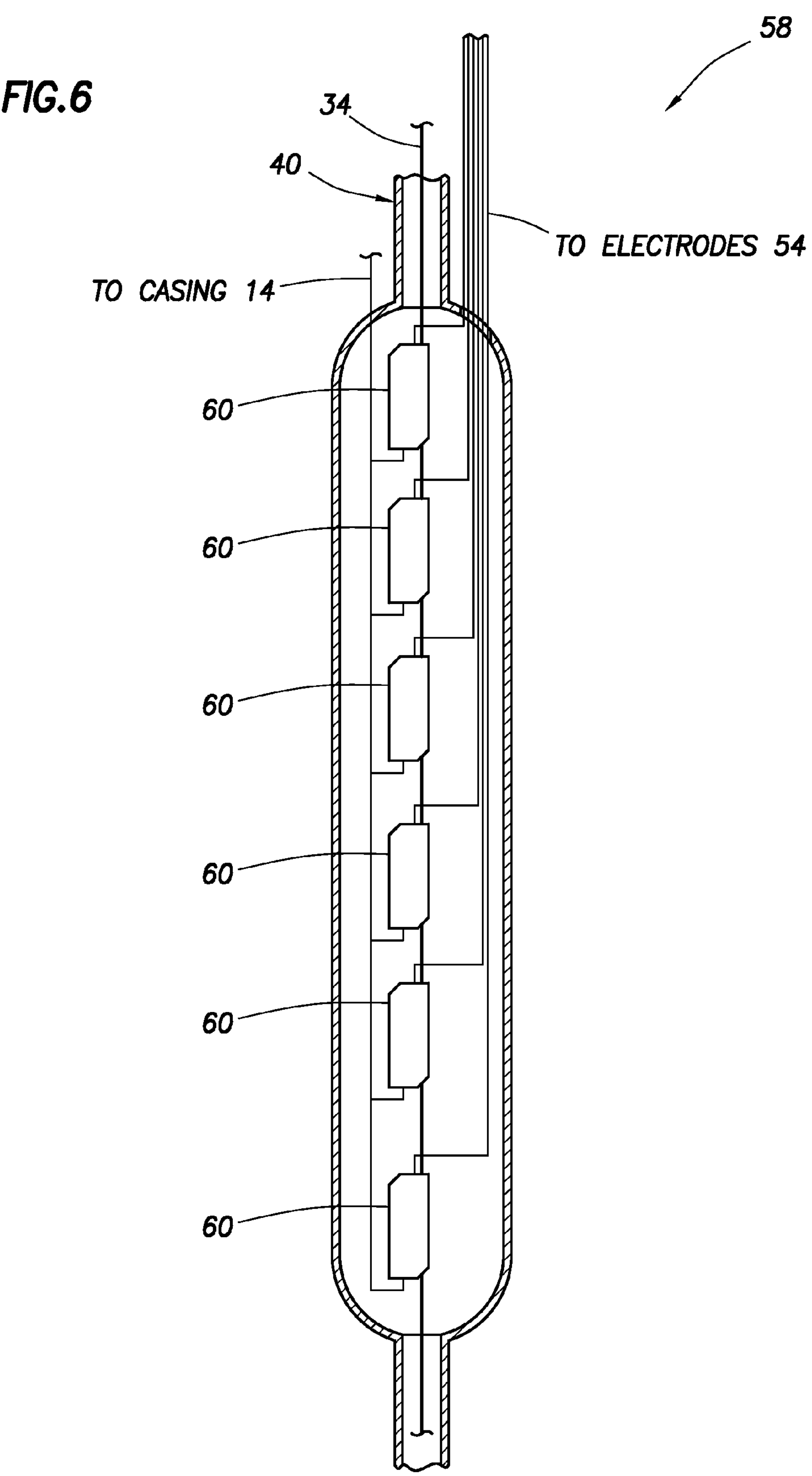
FIG. 6 is a representative partially cross-sectional view of a converter of the sensor.

Referring additionally now to FIG. 6, an example of the converter 58 is representatively illustrated. In this example, the converter 58 comprises multiple electro-mechanical transducers 60 (such as, lead zirconate titanate or another piezoelectric or electrostrictive material).

A number of the transducers 60 and a number of the electrodes 54 are the same (i.e., one transducer for each electrode). In this example, there are six electrodes 54 and six transducers 60, but other numbers may be used, and it is not strictly necessary for the number of electrodes and transducers to be the same in keeping with the principles of this disclosure.

One terminal of each electro-mechanical transducer 60 is electrically connected to an electrode 54 and another terminal of the transducer is electrically connected to the casing 14. The potential difference developed between the casing 14 and each electrode 54 is applied to the electro-mechanical transducer 60.

As the electro-mechanical transducer 60 deforms due to the applied potential, it induces strain in the optical waveguide 34 bonded or otherwise secured to it. Strain in the waveguide 34 can be interrogated at the surface or other remote location using known optical multiplexing and interrogation techniques (such as Brillouin and/or Rayleigh scatter detection in a distributed strain sensing interrogation system).

The use of such optical interrogation techniques obviates any need for multiplexing electronic circuitry downhole (although downhole electronic circuitry may be used in keeping with the principles of this disclosure). The strain induced in the waveguide 34 by each transducer 60 can be linearly proportional to the applied potential.

The converter 58 and waveguide 34 can be packaged in a single tubing encapsulated cable 40 (TEC) that is clamped to the casing 14 and electrically connected to the casing and electrodes 54 as the casing is being deployed. Signals from other sensors 20 (at different axial locations along the casing 14) can be communicated over the same cable 40. Signals from different sensors 20 are differentiated using the interrogator 30 and computer 32 with known optical multiplexing and interrogation techniques.

In other examples, an electronic switching circuit could be used to multiplex signals from different electrodes 54 to an electric or fiber optic cable that delivers the signal uphole.

In another embodiment, electric bipole transmitters may be used to inject and return current between two axially separated points on the same casing 14.

In another embodiment, voltage measurements can be made between two or three axially separated points on the casing 14, instead of radial measurements.

In yet another embodiment, the streaming potential due to the displacement of the spacer fluid 26 as cement 28 is pumped can be sensed by the permanent sensors 20 without any need for current injection from the casing 14 (passive sensing).

Detecting the Top of Cement

The annulus 12 between the casing 14 and the formation 16 may be filled with drilling fluid 24 and/or spacer fluid 26 prior to placement of the cement 28. A baseline measurement is made before pumping cement 28. As cement 28 is pumped, it displaces the drilling fluid 24 and/or spacer fluid 26.

As the cement 28 fills the annulus 12, the interface 46 (see FIG. 1) between the cement and whatever substance was previously in the annulus displaces. Assuming a vertical wellbore 18 as in FIG. 1, the interface 46 will be at a "top" of the cement 28, and the interface will rise in the annulus 12. If the wellbore 18 is instead horizontal, the interface 46 will displace horizontally away from a distal end of the casing 14. Thus, the scope of this disclosure is not limited to any particular direction of displacement of the interface 46.

Ideally, the cement 28 completely displaces the previous substance, with the interface 46 being flat laterally across the annulus 12. However, in reality, the displacement can be more complex, with some fluids or other substances not being flushed properly. Such irregular displacement can degrade cement quality and well integrity. Therefore, it would be beneficial to be able to detect the interface 46, so that the progression of cement 28 in the annulus 12 can be monitored and any discontinuities in the cement due to improperly displaced annulus fluids can be identified.

Right after placement, the resistivity of a cement slurry is typically on the order of a few Ω-m, which is more conductive than the spacer fluid 26 or oil-based mud (OBM) typically used for drilling fluid 24. In this example, injected current from the casing 14 is distributed according to a conductivity difference between drilling fluid 24, spacer fluid 26 and cement 28, as well as the formation 16 resistivity profile. Time-lapse voltage measurements are made, and the baseline measurement is subtracted off as the cement 28 fills in the annulus 12.

The differential voltage measurement at a given sensor 20 is a function of an impedance change at that azimuthal and axial location. These measurements are directly related to the position of the interface 46, and can be inverted for a 3-D image of the cement 28 in the annulus 12.

Figure 7A:
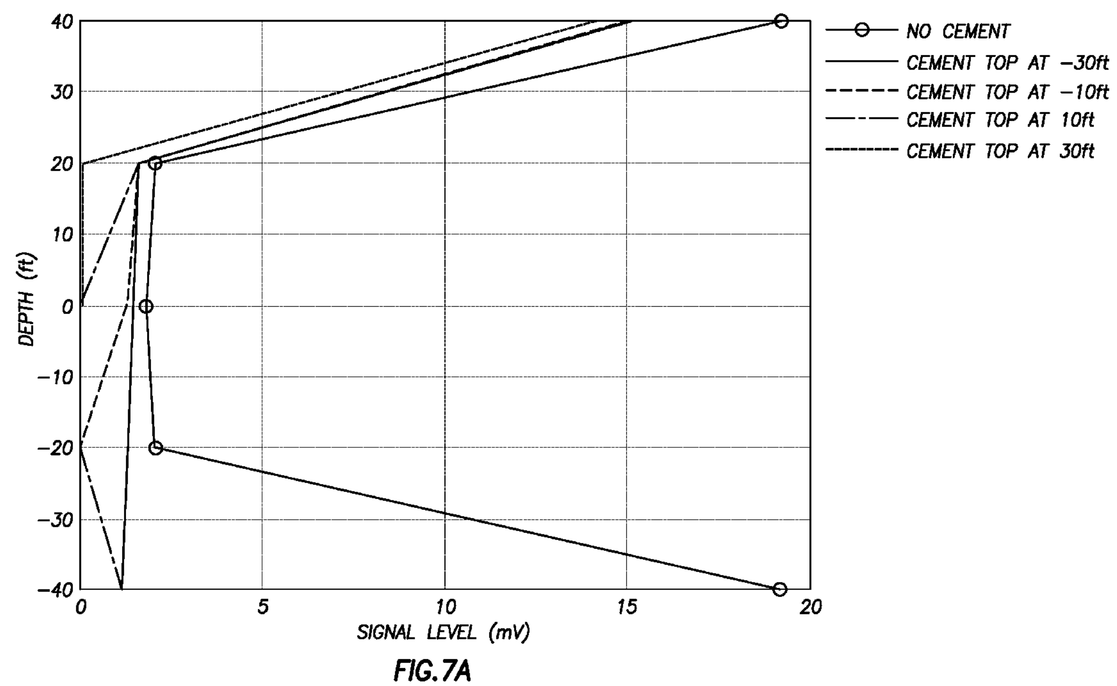
FIGS. 7A & B are representative plots of signal level and sensitivity versus depth, indicating displacement of a cement interface through an annulus.
Figure 7B:
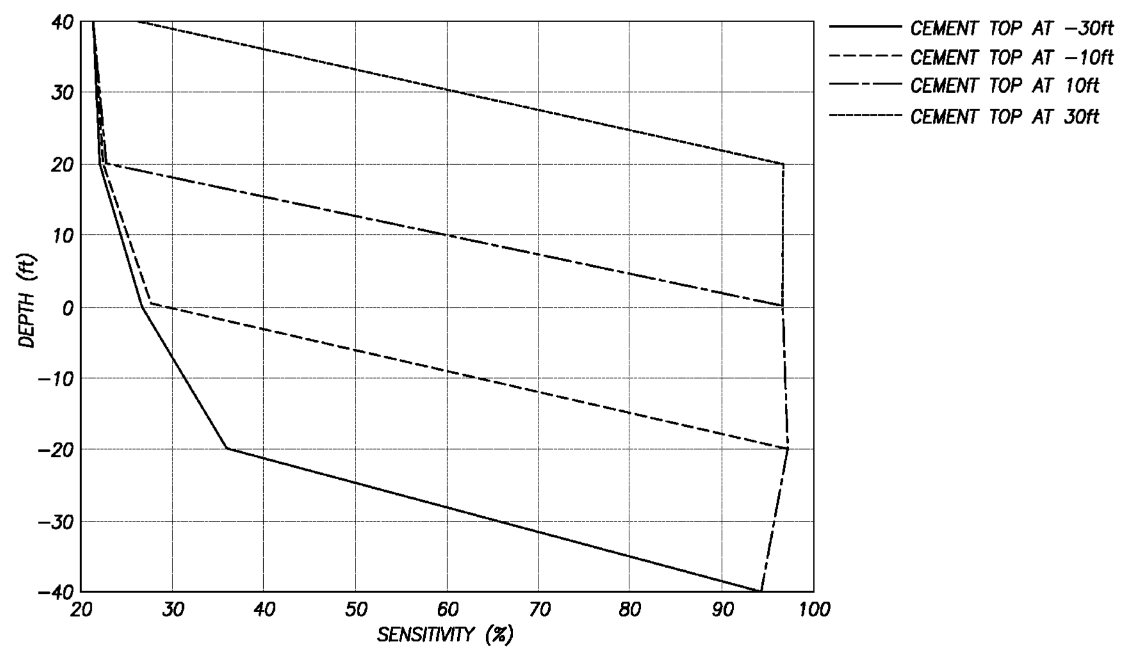

As an example, FIGS. 7A & B plot a total measured signal and sensitivity (percentage change in signal level from the baseline measurement before pumping cement 28) versus depth as the cement is pumped and displaces within the annulus 12. The resistivity of a cement slurry right after placement is taken to be 3.6 Ω-m in this example. The center line (Depth=0) is aligned with a center of the formation 16.

In this example, the following parameters are assumed: casing outer diameter (OD)=7 in. (~18 cm), wellbore 18 diameter=9 in. (~23 cm), formation 16 (reservoir) resistivity=100 Ω-m, shale resistivity=5 Ω-m, reservoir thickness=50 ft. (~15 m), mud resistivity=80 Ω-m, resistivity of cement slurry after placement=3.6 Ω-m. Sensors are 20 ft. (~6 m) apart and sensor electrodes 54 are offset from the casing 14 by 0.5 in. (~13 mm). A current of 1 A is injected and a casing 14 length of 100 m is considered.

A change of more than 95% in signal level is witnessed at sensors 20 where cement 28 displaced drilling fluid 24. Lower change in signal level is observed at other sensors 20. This sensitivity distribution among sensors 20 indicates the position of the interface 46 in the annulus 12.

Monitoring Cement Cure State

Figure 8:
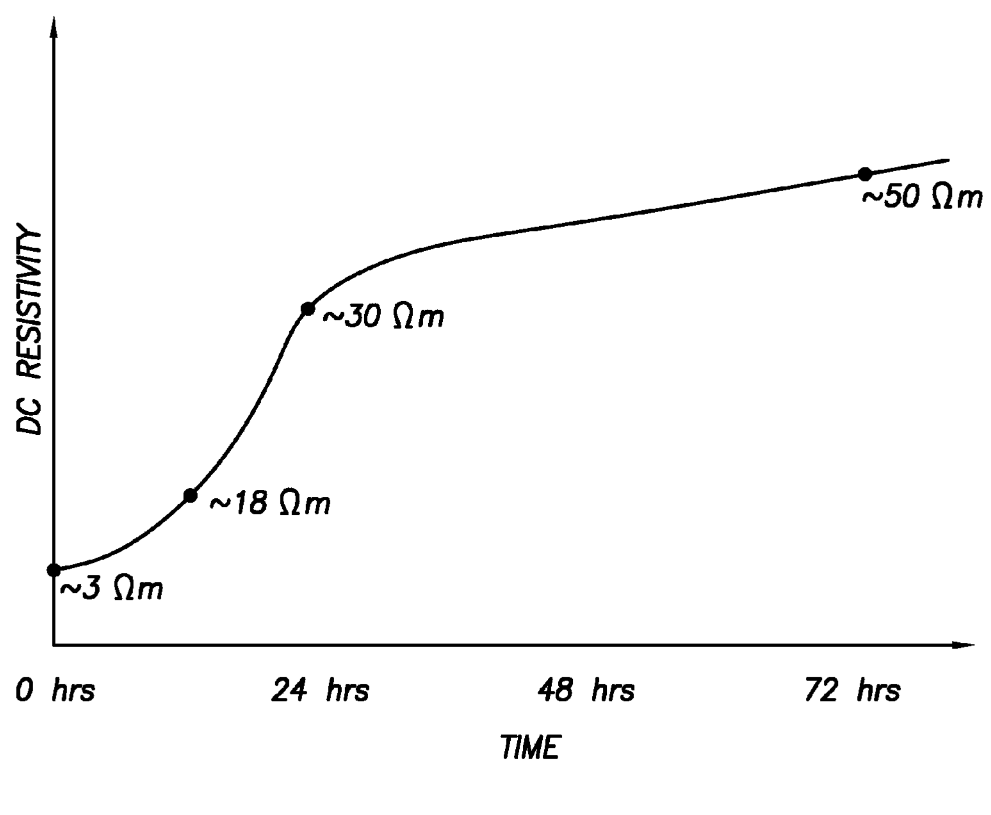
FIG. 8 is a representative plot of resistivity versus time for cement placed in an annulus.

FIG. 8 is an example plot of cement 28 DC resistivity varying from placement to curing. Note that the resistivity increases as the cement 28 cures.

As cement 28 cures, chemical reactions and changes in cementation structure result in changes in the complex resistivity of the cement. These changes in physical properties manifest as changes in a measured impedance. For example, the resistivity of cement measured at a low frequency (40 Hz) can nonlinearly increase from ~3 Ω-m to ~50 Ω-m over approximately 72 hours of curing time.

Figure 9A:
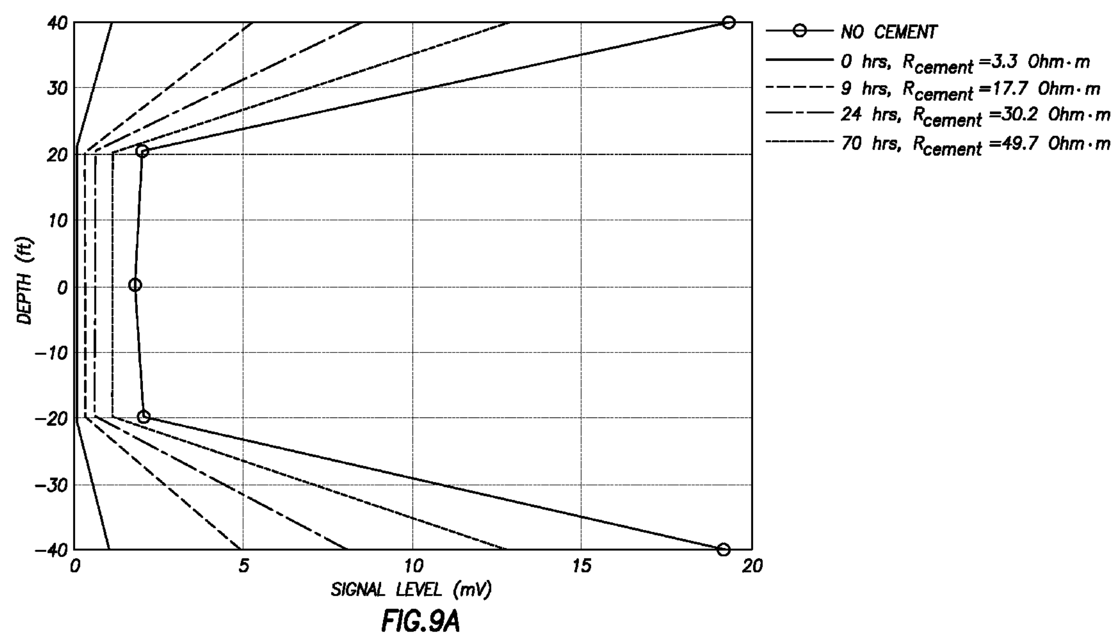
FIGS. 9A & B are representative plots of signal level and sensitivity versus depth, indicating a cure state of the cement over time.
Figure 9B:
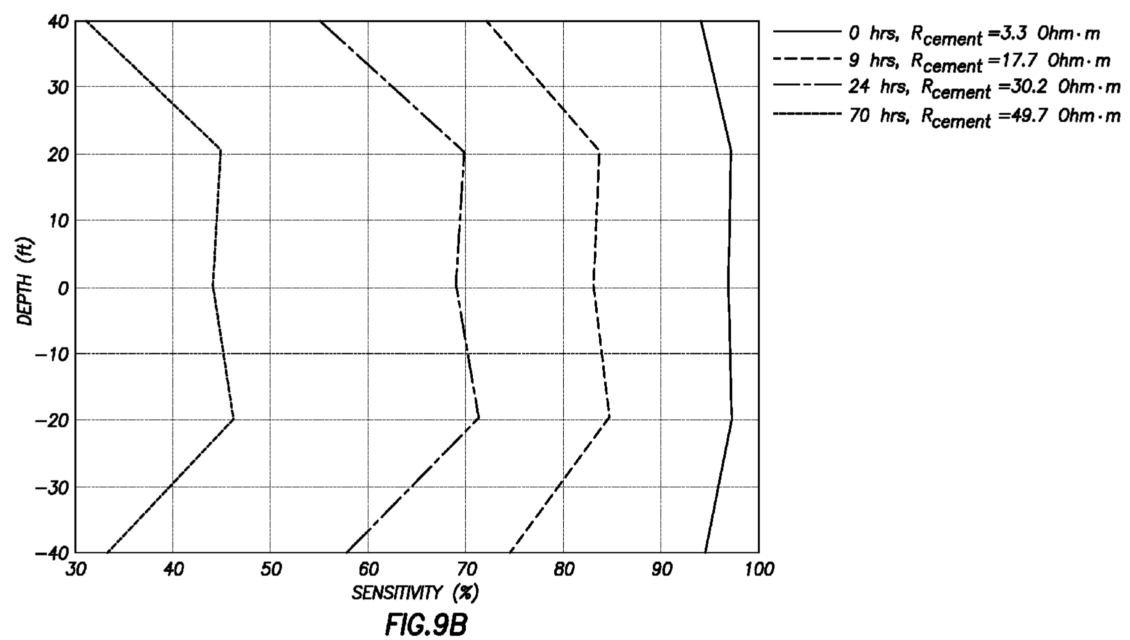

FIGS. 9A & B plot total measured signal (in mV) and sensitivity (percentage change in signal level from the baseline measurement before pumping cement) versus depth as cement 28 cures. Changes in signal levels indicating the change in cement resistivity as it cures can, thus, be used to determine the cure state of cement at different locations along the annulus 12.

Discriminating Annulus Substances

Figure 10:
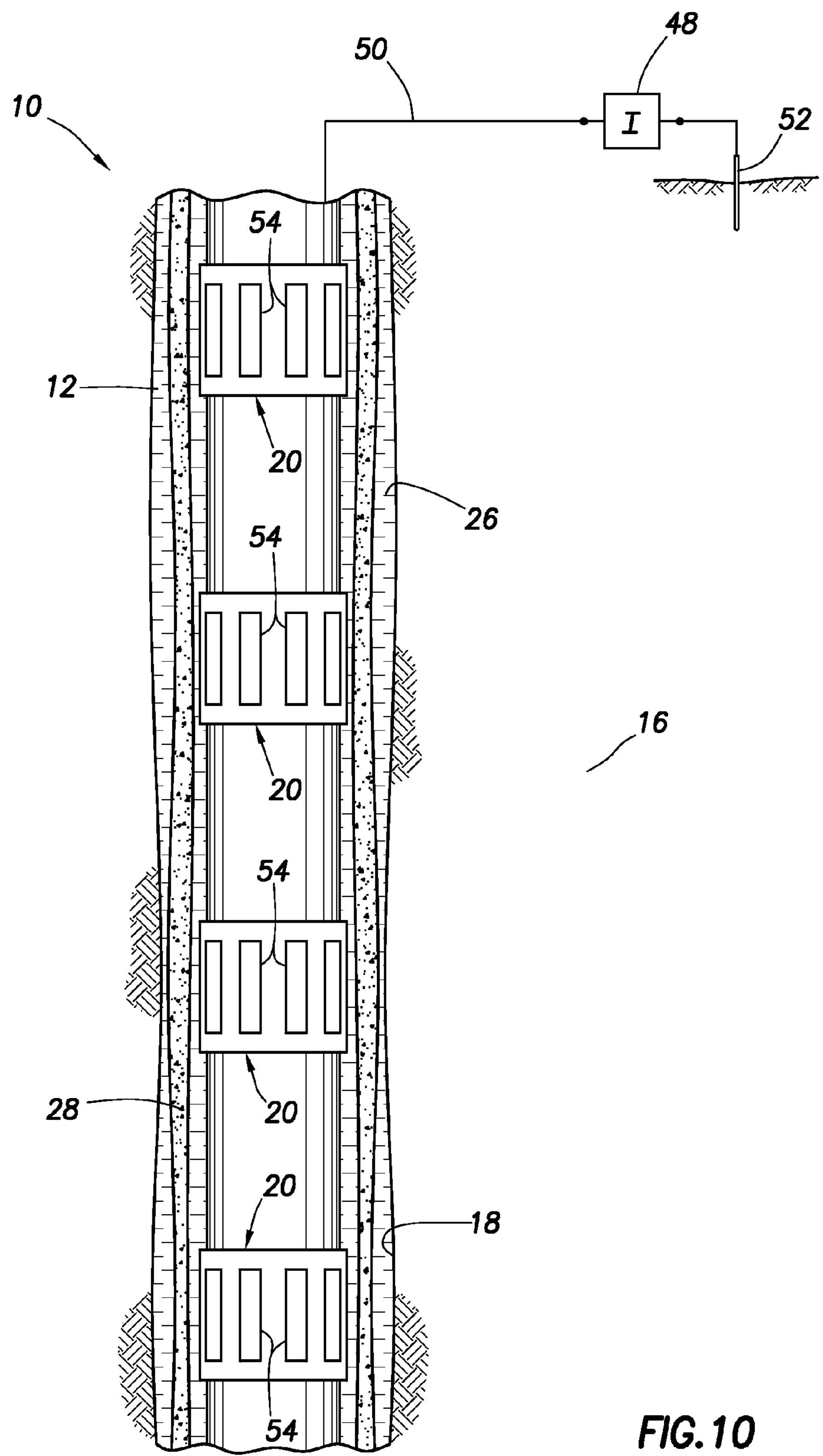
FIG. 10 is a representative partially cross-sectional view of another example of the system and method, wherein the cement incompletely fills the annulus.

Another example of the system 10 is representatively illustrated in FIG. 10. In this example, the system 10 is able to discriminate between substances in the annulus 12 during and/or after placement of the cement 28.

In the FIG. 10 example, the cement 28 occupies only a fraction of the annulus 12, having incompletely displaced the spacer fluid 26. This indicates a poor cementing job that can result in serious consequences, such as, poor contact with the formation 16, corrosion of the casing 14 due to fluid leaks adjacent to the casing, migration of fluids through the annulus 12 between zones, etc.

Figure 11A:
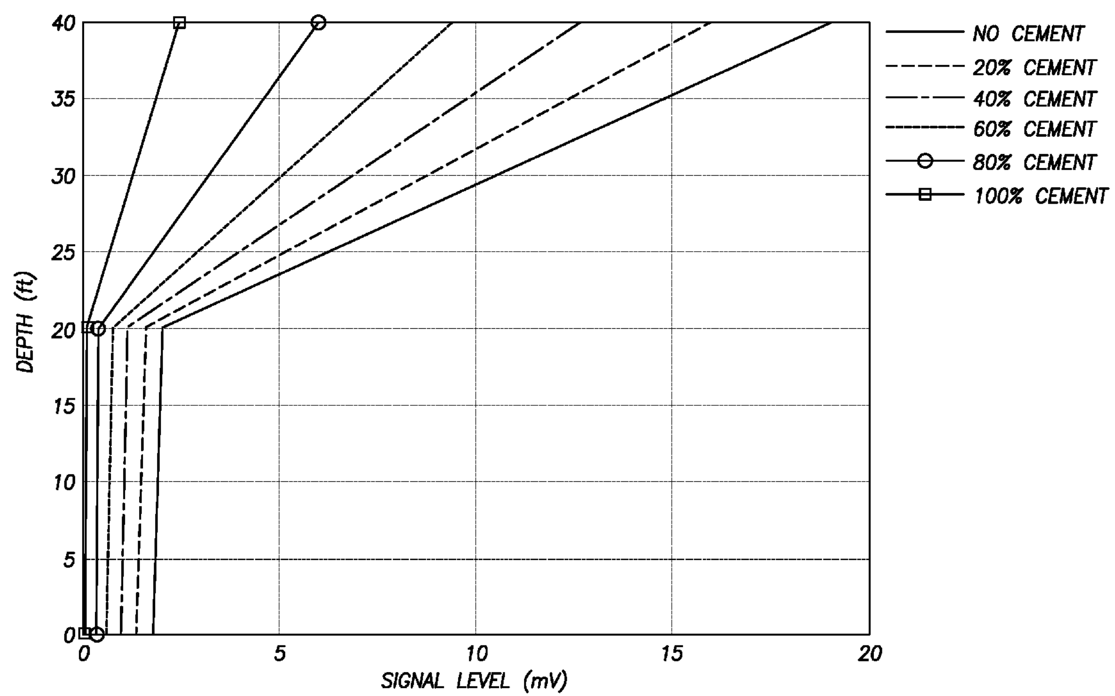
FIGS. 11A & B are representative plots of signal level and sensitivity versus depth, indicating a proportion of the cement in the annulus.
Figure 11B:
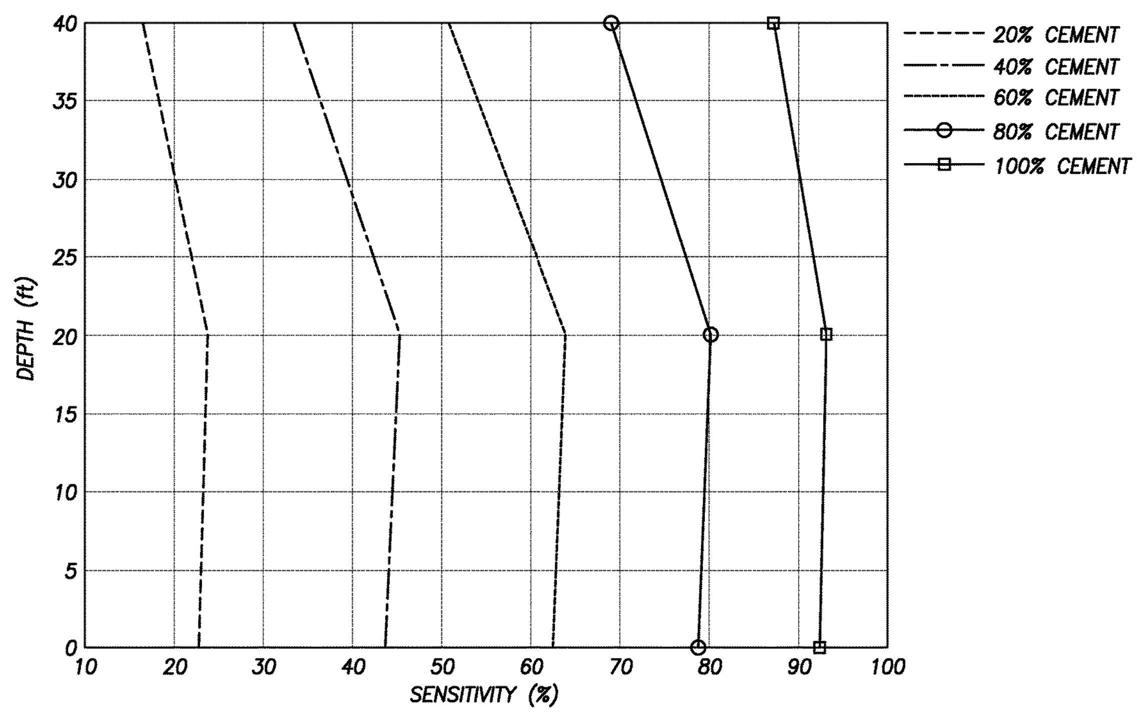

Time-lapse measurements made by the system 10 are sensitive to a percentage of cement 28 in the annulus 12 and, therefore, these measurements can be used to discriminate between annulus substances. As an example, FIGS. 11A & B plot the signal level and sensitivity corresponding to cement 28 with resistivity of 10 Ω-m with different percentages in the annulus 12. Cement 28 is located at a radial center of the annulus 12 as depicted in FIG. 10.

Inversion

Inversion and/or imaging of measured voltages may be non-unique, and thus can provide a degree of uncertainty as to quality of cementation in the annulus 12. Various methods of model parameterization and regularization can be introduced to improve the inversion and/or imaging to reduce the uncertainty in the quality of the cementation.

In one example, the substance (e.g., drilling fluid 24, spacer fluid 26, and cement 28) resistivities can be estimated a priori from physical measurements, such as, at a wellsite, or in a laboratory. The wellbore 18 size can be known a priori from a caliper log. The formation 16 resistivity proximate the sensors 20 can be known or inferred a priori from well logs acquired from open-hole wireline, cased-hole wireline, and/or logging-while-drilling (LWD) instruments. Multiple deterministic-based inversions or stochastic-based inversions and subsequent post-inversion analyses that span different initial models, constraints, and regularization can be performed to quantify model uncertainty.

It may now be fully appreciated that the above disclosure provides significant advancements to the art of monitoring substances in a well annulus. In an example described above, displacement, distribution and cure state of the cement 28 can be effectively detected and communicated using the system 10.

The sensors 20 can be permanently deployed. The sensors 20 can comprise multiple electrodes 54 or a single electrode. The sensors 20 can optically telemeter measurements to a computer 32 at a remote location, such as, the earth's surface, an offshore rig, a subsea location, etc.

The system 10 can utilize a relatively low cost excitation technique by injecting current through the casing 14. The system 10 can also utilize relatively low cost optical telemetry than can be permanently deployed downhole. This obviates any need for electronic multiplexing or switching circuits downhole. The sensors 20 can be simultaneously deployed with other optical-based sensor systems, including but not limited to optical distributed acoustic, temperature, pressure and strain sensing.

The system 10 in some examples does not require any downhole electrical power consumption. The system 10 can be configured so that it does not restrict fluid flow in the annulus 12 formed between the casing 14 and formation 16).

The system 10 can be used to identify, discriminate, and monitor fluids present in the annulus 12. The system 10 can monitor the cure state of cement 28 present in the annulus 12.

The system 10 can be produced efficiently and with relatively low cost pre-fabrication and calibration. The system 10 can be realized with highly reliable materials that can maintain integrity and performance in high pressure environments, such as those typically encountered downhole, and particularly in high pressure, high temperature (HPHT) deep water wells.

The system 10 can support time-lapse EM modeling, inversion, and/or imaging for monitoring fluid or other substance displacements. The system 10 can be interfaced with integrated well management software and related workflows through an application programmable interface (API).

A well monitoring system 10 is provided to the art by the above disclosure. In one example, the system 10 can comprise a current source 48, the current source being electrically connected to casing 14 in a wellbore 18, and at least one sensor 20 including at least one monitoring electrode 54.

An electrical potential difference between the casing 14 and the monitoring electrode 54 results from current applied by the current source 48. The potential difference indicates an impedance of at least one substance (such as, the drilling fluid 24, the spacer fluid 26 and/or the cement 28, etc.) in an annulus 12 external to the casing 14. The potential difference may be converted to strain in an optical waveguide 34.

The "at least one" sensor 20 can comprise multiple sensors spaced apart along the casing 14. Displacement of the substance through the annulus 12 may be indicated by changes in the potential difference at successive ones of the sensors 20. Where the "at least one" substance comprises multiple substances, an interface between the substances can be indicated by different potential differences between adjacent sensors 20.

A cure state of the substance may be indicated by the potential difference. A proportion of the substance in the annulus 12 may be indicated by the potential difference.

A method of monitoring a well is also provided to the art by the above disclosure. In one example, the method can comprise: positioning multiple sensors 20 spaced apart along a casing 14 in a wellbore 18, each of the sensors comprising at least one electrode 54 in electrical contact with at least one substance (such as, the drilling fluid 24, the spacer fluid 26 and/or the cement 28, etc.) in an annulus 12 formed between the casing 14 and the wellbore 18; inducing current in the casing 14; and measuring a potential difference between the casing 14 and the electrode 54 at each sensor 20.

The method can include determining a cure state of the substance at each sensor 20 based on the potential difference.

The method can include monitoring a displacement of the substance through the annulus 12, based on changes in the potential difference at each sensor 20.

The "at least one" substance can comprise multiple substances, in which case the method can comprise determining a location of an interface 46 between the substances based on different potential differences at adjacent sensors 20.

The method can include determining a proportion of the substance in the annulus 12, based on the potential difference.

The measuring step can include converting the potential difference to strain in an optical waveguide 34. The method can include detecting optical scattering in the optical waveguide 34 as an indication of the strain.

Another well monitoring system 10 example described above can comprise a current source 48, the current source being electrically connected to casing 14 in a wellbore 18, and at least one sensor 20 including at least one monitoring electrode 54 and a converter 58 that converts an electrical potential difference between the casing 14 and the electrode 54 into strain in an optical waveguide 34.

Displacement of a substance (such as, the drilling fluid 24, spacer fluid 26 and/or cement 28, etc.) through an annulus 12 may be indicated by changes in the potential difference at successive ones of the sensors 20. An interface between substances in an annulus 12 may be indicated by different potential differences between adjacent sensors 20.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A well monitoring system, comprising:

a current source electrically connected to casing in a wellbore to induce a current in the casing;

at least one sensor including at least one monitoring electrode;

an insulator positioned between the casing and the at least one monitoring electrode to partially electrically insulate the at least one monitoring electrode from the current in the casing; and wherein an electrical potential difference between the casing and the monitoring electrode results from current applied by the current source, and wherein the potential difference indicates an impedance due in part to at least one substance in an annulus formed between the casing and an earth formation.

2. The system of claim 1, wherein the insulator is between 0.05 inches and 0.5inches thick.

3. The system of claim 1, wherein the at least one sensor comprises multiple longitudinally spaced apart sensors.

4. The system of claim 3, wherein change of physical properties of the substance through the annulus is indicated by changes in the potential difference at successive ones of the sensors along the casing, and wherein the change of physical properties is selected from the group consisting of, during a life history of the well, a) displacement, b) curing, c) fluid inflow and d) fluid outflow.

5. The system of claim 3, wherein the at least one substance comprises multiple substances, and wherein an interface between the substances is indicated by different potential differences between adjacent sensors.

6. The system of claim 1, wherein a cure state of the substance is indicated by the potential difference.

7. The system of claim 1, wherein the potential difference indicates at least one of the group consisting of a proportion of the substance in the annulus and a discrimination of different fluids in the annulus.

8. A method of monitoring a well, the method comprising:

positioning multiple sensors spaced apart along a casing in a wellbore, each of the sensors comprising at least one electrode and an insulator positioned between the at least one electrode and the casing to partially electrically insulate the at least one monitoring electrode from the current in the casing, and each of the sensors forms an electrical circuit with at least one substance in an annulus formed between the casing and the wellbore;

injecting current in the casing; and measuring a potential difference between the casing and the electrode at each sensor.

9. The method of claim 8, further comprising determining a cure state of the substance at each sensor based on the potential difference.

10. The method of claim 8, further comprising monitoring a change in physical properties of the substance through the annulus, based on changes in the potential difference at each sensor, and wherein the change in physical properties is selected from the group consisting of, during a life history of the well, a) displacement, b) curing, c) fluid inflow and d) fluid outflow.

11. The method of claim 8, wherein the at least one substance comprises multiple substances, and further comprising determining a location of an interface between the substances based on different potential differences at adjacent sensors.

12. The method of claim 8, further comprising determining, based on the potential difference, at least one of the group consisting of a proportion of the substance in the annulus and a discrimination of different fluids.

13. The method of claim 8, wherein the insulator is between 0.05 inches and 0.5 inches thick.

14. The method of claim 13, further comprising detecting optical scattering in the optical waveguide as an indication of the strain.

15. A well monitoring system, comprising:

a current source, the current source being electrically connected to casing in a wellbore to induce a current in the casing;

at least one sensor including at least one monitoring electrode, and a converter that converts an electrical potential difference; and an insulator positioned between the casing and the at least one monitoring electrode to partially electrically insulate the at least one monitoring electrode from the current in the casing.

16. The system of claim 15, wherein the at least one sensor comprises multiple sensors spaced apart along the casing.

17. The system of claim 16, wherein changes in the potential difference at successive ones of the sensors indicates, during a life history of the well, at least one of the group consisting of displacement, curing, fluid inflow and fluid outflow.

18. The system of claim 16, wherein an interface between substances in an annulus is indicated by different potential differences between adjacent sensors.

19. The system of claim 15, wherein a cure state of a substance is indicated by the potential difference.

20. The system of claim 15, wherein the potential difference indicates at least one of the group consisting of a proportion of a substance in an annulus and a discrimination of different fluids.

21. The system of claim 15, wherein the converter converts the electrical potential difference between the casing and the electrode into strain in an optical waveguide.

* * * * *